Patented May 7, 1929.

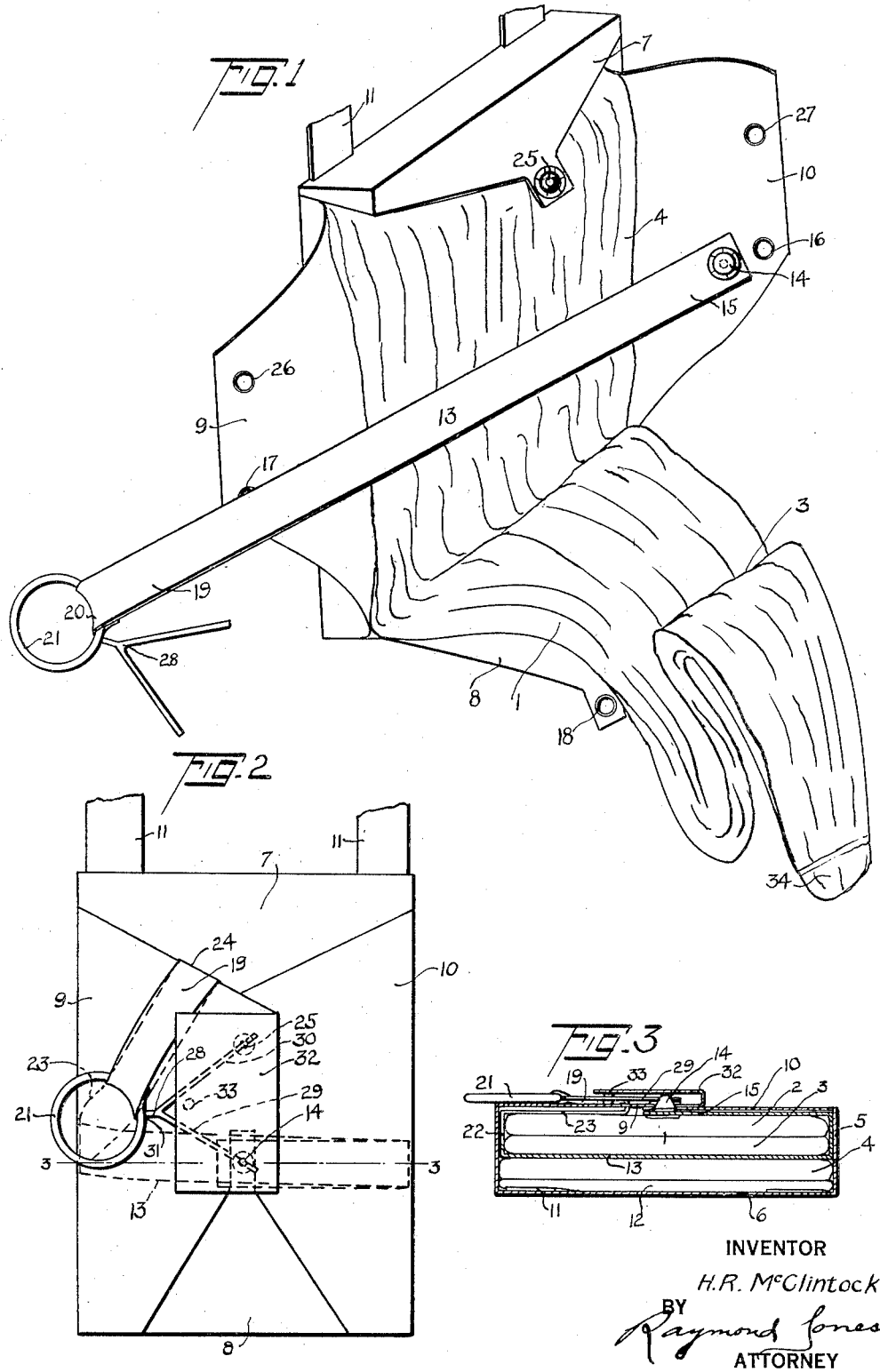

1,712,307

UNITED STATES PATENT OFFICE.

HERBERT R. McCLINTOCK, OF SAN DIEGO, CALIFORNIA, ASSIGNOR TO RUSSELL PARACHUTE COMPANY, OF WILMINGTON, DELAWARE, A CORPORATION OF DELAWARE.

PARACHUTE PACK.

Application filed January 5, 1926. Serial No. 79,355.

This invention relates to parachutes and particularly to a novel means for causing the forcible ejecting of at least a part of the parachute from the parachute pack in which it is contained.

The primary object of the invention is the provision in a parachute pack of a strip of flexible material which is connected to the pull ring and which extends around a portion or a fold of the parachute so that when the pull ring is operated the portion of the parachute embraced by the strip will be forcibly ejected and insure the proper opening of the parachute. The pull ring is connected to the usual rip cord or pull cord or wire which is used for maintaining the closure flaps of the parachute container closed. The locking cone through which the rip cord extends is carried by the end of the flexible strip mentioned so that there will be nothing to cause entanglements of the lines of the parachute.

This means of manually ejecting the parachute makes for a more positive action on the part of the opening of the pack than the customary arrangement and takes advantage of the always available jerk of the rip cord ring to release the flaps of the container.

Further objects of the invention will be more fully set forth in the following description and claims, and in the drawings in which Fig. 1 is a view of the parachute pack after the pull ring has been jerked, showing the fold of the parachute ejected from the pack.

Fig. 2 is a plan view of the parachute pack showing the application of the ejecting tape, and Fig. 3 is section on the line 3—3 of Fig. 2.

Referring to the drawings my invention is shown as applied to a free type pack, that is, one which is adapted to be worn by the aviator and which is free from connection to the airplane or balloon in which the aviator may be travelling. The parachute 1 is arranged in folds 2, 3, and 4, within the container 5 which consists of the customary back 6 and the top and bottom closure front flaps 7 and 8, together with two side flaps 9 and 10, and flaps 7, 8, 9 and 10 fold together as shown in the drawings. The supporting straps 11 extend along the back of the container and are attached to the supporting cords 12 which are arranged beneath the fold 4 of the parachute. Any suitable harness arrangement may be used to attach the pack to the back of the aviator, or in any other desirable location.

In order to cause the forcible ejection of at least a part of the parachute, a flexible strip or tape 13 is arranged so that it extends across the pack between two adjacent folds of the parachute, the drawings showing the strip extending between the folds 3 and 4. At one end of the strip 13 is a locking cone 14 and the end 15 of the strip which bears this locking cone is folded back across the top fold 2 so that the locking cone 14 will be positioned adjacent the grommets 16, 17 and 18 of the flaps 10, 9 and 8 respectively, when these flaps are in their closed position shown in Fig. 2. The opposite end 19 of the tape is connected at 20 to a pull ring 21 which is suitably placed in a position where it may be readily grasped by the wearer when it is to be used. This end 19 of the tape extends up along the side of the parachute at 22 and then diagonally across underneath the flap 9 as indicated at 23. At the point 24 the tape emerges from the pack and folds over the top of the flap 9.

A second locking cone 25 is located on the top flap 7 of the pack, so as to engage with the grommets 26 and 27 of the two side flaps. The grommets are maintained in engagement with the cones so that the flap will be maintained closed by means of the rip cord or pull wire 28, which has branches 29 and 30 extending through holes in the cones 14 and 25 in the customary manner. The rip cord 28 is connected at 31 to the pull ring 21.

The side flap 9 is provided with an overlapping extension 32 which protects and covers the locking cones and the branches of the rip cord. One or more snap fasteners 33 fasten the loose end of this extension to the flap 9.

The peak portion of the parachute 34 is preferably arranged so that it will be one of the first folds ejected and the air resistance upon this portion of the parachute causes the immediate withdrawal of the rest of the parachute. It will now be clear that as the pull ring 21 is jerked by the falling aviator, the rip cord is pulled out of the locking cones so that the flaps of the pack will be immediately opened. At the same time the jerk upon the ring pulls the end 19 of the flexible strip 13 which causes the forcible manual ejection of the fold or folds of the parachute which are embraced by this strip. The same action pulls bodily upon the flap 9, causing it to open wide, since the end 19 of the strip is folded under this flap. After the sudden straightening of the strip or band 13 which causes the expulsion of the outer folds of the parachute, the locking cone 14 on the end of this band is freed entirely from the pack, since it may slip out of the grommet 16 without material resistance. The aviator upon violently jerking the ring usually throws the rip cord assembly away, letting go of it when his arm is fully extended. Upon the aviator throwing the ring with the strip or band 13 away, there is nothing remaining to cause entanglement of the lines or folds of the parachute, and the air catches the freed portion of the parachute and withdraws the remaining portion of the folds and the shrouds to a position where the parachute may be opened. The provision of the locking cone 14 upon the end of the band or tape prevents the fastening of the pack without placing the ejection strip in its proper position. This means for causing the manual ejection of the parachute makes for a more positive action on the part of the opening of the pack, and takes advantage of the always available spasmodic jerk of the pull ring.

I am aware that various modifications may be made within the scope of my invention and do not intend to be limited to the precise construction which has been chosen therein for purposes of illustration of my invention.

I claim:

1. A free type parachute pack adapted to be worn by an aviator comprising a parachute container having closure flaps, a folded parachute within said container, a fastening cone extending through said flaps, a strip of flexible material on which said cone is mounted at one end and connected at its other end to a pull ring, said strip extending under one of said flaps and around a fold of the parachute, and a pull cord connected to said ring and extending through said cone for maintaining said closure flaps closed.

2. A free type parachute pack adapted to be worn by an aviator comprising a parachute container having a closure flap, locking cones therefor, a folded parachute in said container, and a manually operable pull cord releasably connected to said cones and to said flap to cause the positive manual opening of said flap.

3. In a free type parachute pack adapted to be worn by an aviator, in combination, a parachute container and a closure therefor, a parachute folded back and forth within said container, a short manually operable pull ring and cord assembly for releasing said closure and a tape operably connected to said pull ring and extending partly around the folded parachute for releasing the closure from said container and freeing the parachute when said pull ring is operated.

4. In a free type parachute pack adapted to be worn by an aviator, in combination, a parachute container, a closure therefor, a parachute folded back and forth within said container entirely free of said closure, manually operable means for releasing said closure in a positive manner when desired and a device connected to said means and including a tape looped transversely about a fold of the parachute for manually causing the separation of said fold from the rest of the parachute.

5. A free type parachute pack adapted to be worn by an aviator comprising a parachute container having a closure member, locking cones for said closure member, a parachute folded back and forth in said container, and means for manually and forcibly opening the pack and ejecting a part of the parachute comprising a pull ring and wire assembly for releasing the locking cones, and additional means operably connected to said assembly and to said closure member and transversely embracing a fold of the parachute for positively and forcibly opening said member and separating said fold from the rest of the parachute.

In testimony whereof I have hereunto set my hand this 21 day of December, 1925.

HERBERT R. McCLINTOCK.